United States Patent
Saggu et al.

(10) Patent No.: US 11,836,994 B2
(45) Date of Patent: *Dec. 5, 2023

(54) METHODS AND APPARATUS FOR AUTOMATIC COLLECTION OF UNDER-REPRESENTED DATA FOR IMPROVING A TRAINING OF A MACHINE LEARNING MODEL

(71) Applicant: PlusAI, Inc., Cupertino, CA (US)

(72) Inventors: Inderjot Saggu, Cupertino, CA (US); Mianwei Zhou, Santa Clara, CA (US); Ankur Agarwal, San Jose, CA (US); Anurag Ganguli, Milpitas, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,748

(22) Filed: Sep. 12, 2022

(65) Prior Publication Data
US 2023/0196792 A1 Jun. 22, 2023

Related U.S. Application Data

(63) Continuation of application No. 17/553,276, filed on Dec. 16, 2021, now Pat. No. 11,443,531.

(51) Int. Cl.
*G06K 9/00* (2022.01)
*G06V 20/56* (2022.01)
(Continued)

(52) U.S. Cl.
CPC ........... *G06V 20/588* (2022.01); *G06N 20/00* (2019.01); *G06T 7/74* (2017.01); *G06V 10/764* (2022.01);
(Continued)

(58) Field of Classification Search
CPC .... G06V 20/588; G06V 10/764; G06N 20/00; G06T 7/74; G06T 2207/20081; G06T 2207/30256
See application file for complete search history.

(56) References Cited

U.S. PATENT DOCUMENTS 11,294,392 B2   4/2022   Ji et al.
2013/0293717 A1  11/2013   Zhang et al.
(Continued)

FOREIGN PATENT DOCUMENTS

| CN | 110866433 A |   | 3/2020 |
| CN | 112721935 A |   | 4/2021 |
| CN | 113071518 A | * | 7/2021 |

*Primary Examiner* — Xin Jia
(74) *Attorney, Agent, or Firm* — Sheppard Mullin Richter & Hampton LLP

(57) ABSTRACT

In some embodiments, a method can include executing a first machine learning model to detect at least one lane in each image from a first set of images. The method can further include determining an estimate location of a vehicle for each image, based on localization data captured using at least one localization sensor disposed at the vehicle. The method can further include selecting lane geometry data for each image, from a map and based on the estimate location of the vehicle. The method can further include executing a localization model to generate a set of offset values for the first set of images based on the lane geometry data and the at least one lane in each image. The method can further include selecting a second set of images from the first set of images based on the set of offset values and a previously-determined offset threshold.

20 Claims, 4 Drawing Sheets

(51) Int. Cl.
*G06V 10/764* (2022.01)
*G06N 20/00* (2019.01)
*G06T 7/73* (2017.01)

(52) U.S. Cl.
CPC ............... *G06T 2207/20081* (2013.01); *G06T 2207/30256* (2013.01)

(56) References Cited

U.S. PATENT DOCUMENTS

| | | | | |
|---|---|---|---|---|
| 2018/0025235 A1* | 1/2018 | Fridman | ............ | G01C 21/3852 |
| | | | | 382/103 |
| 2020/0210696 A1* | 7/2020 | Hou | ................... | G06V 10/7515 |
| 2021/0312194 A1* | 10/2021 | Yang | ................... | G06V 20/588 |

* cited by examiner

METHODS AND APPARATUS FOR AUTOMATIC COLLECTION OF UNDER-REPRESENTED DATA FOR IMPROVING A TRAINING OF A MACHINE LEARNING MODEL

CROSS-REFERENCE TO RELATED APPLICATIONS

This application is a continuation of U.S. patent application Ser. No. 17/553,276, filed on Dec. 16, 2021 and entitled "METHODS AND APPARATUS FOR AUTOMATIC COLLECTION OF UNDER-REPRESENTED DATA FOR IMPROVING A TRAINING OF A MACHINE LEARNING MODEL", which is incorporated in its entirety herein by reference.

TECHNICAL FIELD

The present disclosure generally relates to apparatus and methods for automatic collection of data to improve training of machine learning models, and especially to apparatus and methods for automatic collection of under-represented data for improving an accuracy and/or a safety of machine learning models used, for example, in self-driving vehicles.

BACKGROUND

Some known automated machine learning apparatus and methods can be useful in, for example, autonomous driving, image classification, anomaly detection, medical image diagnosis, fraud detection, etc. Some known apparatus and methods for training machine learning models, however, can rely on biased training data that include more of a particular data type while neglecting other data types. Machine learning models trained on such biased data can be error-prone when analyzing the neglected data types. Moreover, the collection of data often involves human intervention, which can be very time consuming and expensive. Thus, a need exists for apparatus and methods that can automatically collect data for improving a training of a machine learning model.

SUMMARY

In some embodiments, a method can include executing a first machine learning model to detect at least one lane in each image from a first set of images. The method can further include determining an estimate location of a vehicle for each image, based on localization data captured using at least one localization sensor disposed at the vehicle. The method can further include selecting lane geometry data for each image, from a map and based on the estimate location of the vehicle. The method can further include executing a localization model to generate a set of offset values for the first set of images based on the lane geometry data and the at least one lane in each image. The method can further include selecting a second set of images from the first set of images based on the set of offset values and a previously-determined offset threshold.

DETAILED DESCRIPTION

Non-limiting examples of various aspects and variations of the embodiments are described herein and illustrated in the accompanying drawings.

One or more embodiments described herein generally relate to apparatus and methods for processing structured and semi-structured data, and in particular, apparatus and methods to collect under-represented data for training a machine learning model based on output of the machine learning model. In some embodiments, a data collection device (e.g., data collection device 110 described below in connection with FIG. 1) can be used to process, for example, images, videos, time series, stationary data, non-stationary-data, and/or the like.

Described herein are data collection devices and methods that are suitable for collecting data for training highly reliable machine learning models, for example, for lane detection in autonomous vehicles. Images captured from a vehicle can be taken in a wide range of scenarios such as, for example, roads, traffic condition, weather condition, etc. Therefore, the images can include a wide variety of color, texture, lighting, background, noise, and/or other factors. Training a versatile machine learning model that can perform, for example, a lane detection task or an image classification tasks, in the domain of images taken from a vehicle can be data-intensive and collecting interesting data (e.g., under-represented data, rare data compared to generally collected data) that represent images in the wide range of scenarios can be challenging and costly. To solve that challenge, data collection devices and methods described herein for example can identify interesting data (thousands of images, millions of images, and/or the like) for training the machine learning model (e.g., a lane detection convolutional neural network model) automatically and at machine speed. Otherwise, training the machine learning model without identifying interesting data would potentially fail to reliably detect lanes in underrepresented scenarios.

While the methods and apparatus are described herein as processing data from a set of files, a set of images, a set of videos, a set of databases, and/or the like, in some instances a data collection device (e.g., data collection device 110 described below in connection with FIG. 1) can be used to generate all or some of the set of files, the set of images, the set of videos, and/or the set of databases. Therefore, the data collection device can be used to process and/or generate any collection or stream of data. As an example, the data collection device can process and/or generate any string(s), number(s), image(s), video(s), executable file(s), model(s), dataset(s), and/or the like.

Figure 1:
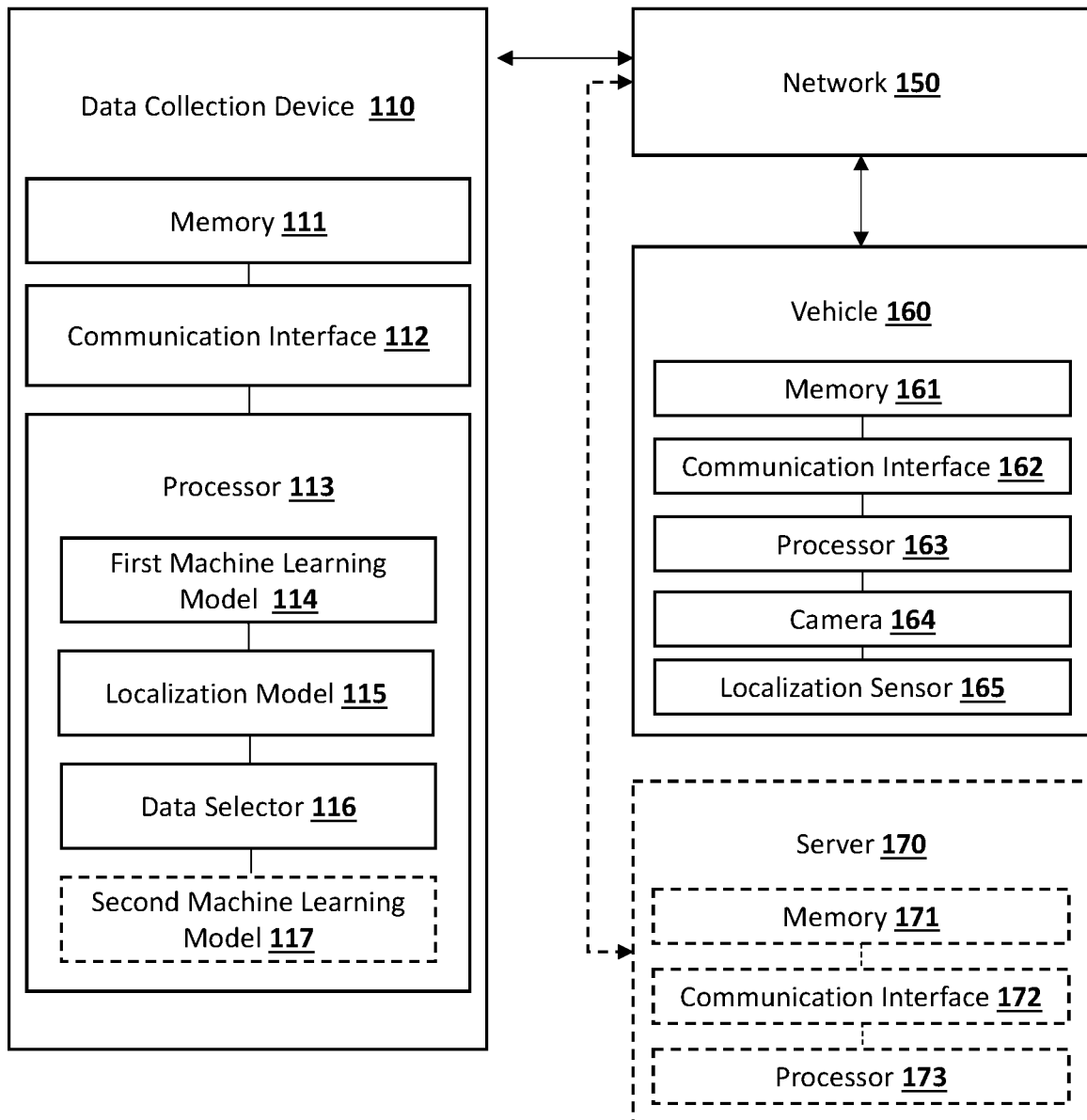
FIG. 1 is a schematic description of a data collection device, according to an embodiment.

FIG. 1 is a schematic description of a data collection device 110, according to an embodiment. The data collection device 110 can be operatively coupled to a vehicle 160 and optionally can be operatively coupled to a server 170, to transmit and/or receive data and/or analytical models via a network 150. The data collection device 110, the vehicle 160, and the server 170 each can include a hardware-based computing device and/or a multimedia device (e.g., with a memory, a communication interface, and a processor as described herein in further details), such as, for example, a computer, a desktop, a laptop, a smartphone, a tablet, a wearable device, and/or the like. Although only one data collection device 110, network 150, vehicle 160 and server 170 are shown in FIG. 1 for simplicity, it should be understood that any number of such devices are possible. For example, a given data collection device 110 can be receive data via one or more networks 150 from any number vehicles 160.

The data collection device 110 includes a memory 111, a communication interface 112, and a processor 113. The processor 113 of the data collection device 110 includes a first machine learning model 114 (also referred to as the "lane detection model"), a localization model 115, and a data selector 116, which collectively detect a lane in each image from a set of images captured from a vehicle and determine whether the image is interesting (e.g., under-represented data, rare data compared to generally collected data) to be used for training (e.g., re-training or on-the-fly active learning) the first machine learning model 114. In addition, the processor 113 can optionally include a second machine learning model 117 (also referred to as the "annotation model").

In some instances, the data collection device 110 can receive, via a network 150, data including a set of images and/or localization data from the vehicle 160, for example, in response to an indication of the data collection device 110 requesting certain types of interesting data (e.g., to improve a machine learning model's performance for identifying lanes in a specific scenario) and/or in response to the vehicle 160 starting to operate. In some instances, the data collection device 110 can receive, via the network 150, the data including the set of images and/or the localization data from the server 170, for example, after being received from a set of vehicles including the vehicle 160, stored and organized by the server 170. In some instances, the data collection device 110 can receive a set of video files from the vehicle 160 and/or the server 170, which can be analyzed frame-by-frame to generate the set of images.

The memory 111 of the data collection device 110 is operatively coupled to the processor 113 and the communication interface 112, and can be, for example, a memory buffer, a random access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multi-media card (eMMC), a universal flash storage (UFS) device, and/or the like. The memory 111 can store, for example, the set of images, the localization data, the set of videos, and/or code that includes instructions to cause the processor 113 to perform one or more processes or functions (e.g., the first machine learning model 114, the localization model 115, the data selector 116, and/or the second machine learning model).

The memory 111 can also store files associated with (e.g., generated by executing) the first machine learning model 114 and/or optionally the second machine learning model 117. These files can include data generated by the first machine learning model 114 and/or the second machine learning model 117 during the operation of the data collection device 110. For example, the files associated with the first machine learning model 114 and/or the second machine learning model 117 can include temporary variables, return memory addresses, variables, a graph of the first machine learning model 114 and/or the second machine learning model 117 (e.g., a set of arithmetic operations or a representation of the set of arithmetic operations used by the first machine learning model 114 and/or the second machine learning model 117), the graph's metadata, assets (e.g., external files), electronic signatures (e.g., specifying a type of the first machine learning model 114 and/or the second machine learning model 117 being exported, and the input/output tensors), and/or the like, generated during the operation of the first machine learning model 114 and/or the second machine learning model 117.

The communication interface 112 of the data collection device 110 can be a hardware component of the data collection device 110 to facilitate data communication between the data collection device 110 and external devices (e.g., the network 150, the vehicle 160, the server 170, and/or the like) and is operatively coupled to the memory 111 and the processor 113. The communication interface 112 can be, for example, a network interface card (NIC), a Wi-Fi® module, a Bluetooth® module, an optical communication module, and/or any other suitable wired and/or wireless communication interface. The communication interface 112 can be configured to connect the data collection device 110 to the network 150. In some instances, the communication interface 112 can facilitate receiving or transmitting data via the network 150. For example, in some instances, the communication interface 112 can facilitate receiving or transmitting the set of images and/or the localization data, the first machine learning model 114, the localization model 115, and/or the like through the network 150 from/to the vehicle 160, or the server 170, each communicatively coupled to the data collection device 110 via the network 150.

The processor 113 can be, for example, a hardware based integrated circuit (IC) or any other suitable processing device configured to run or execute a set of instructions or a set of codes. For example, the processor 113 can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 113 is operatively coupled to the memory 111 through a system bus (for example, address bus, data bus, and/or control bus; not shown).

The processor 113 includes the first machine learning model 114, the localization model 115, and the data selector 116, and can optionally include the second machine learning model 117. Each of the first machine learning model 114, the localization model 115, the data selector 116, and/or the second machine learning model 117 can include software stored in the memory 111 and executed by the processor 113. For example, a code to cause the first machine learning model 114 to detect a set of lanes from the first set images can be stored in the memory 111 and executed by the processor 113. Alternatively, each of the first machine learning model 114, the localization model 115, the data selector 116, and/or the second machine learning model 117 can be a hardware-based device. For example, a process to cause the second machine learning model 117 to classify an image as in a scenario from a set of scenarios can be implemented on an individual integrated circuit chip. The set of scenarios can include, but is not limited to, one or more road/lane condition scenarios (e.g., merge lane, split lane, under construction, no construction, etc.), one or more traffic condition scenarios (e.g., light traffic, heavy traffic, etc.), one or more day light scenarios (e.g., shade, daytime, night, twilight, etc.), and/or one or more weather condition scenarios (e.g., rain, storm, snow, etc.).

The first machine learning model 114 can include a set of model parameters (e.g., weights, biases, activation functions, etc.) that can be executed to detect at least one lane in each image from the set of images. The first machine learning model 114 is operatively coupled to the localization model 115 and/or the data selector 116 and can generate an indication of lane in an image from the first set of images and in response to receiving the image. The first machine learning model 114 can be run (or executed) in (1) a training phase that adjusts the set of model parameters for an improved/desired output (e.g., an indication of at least one lane) or (2) an execution phase that generates an output (e.g., an indication of at least one lane) based executing arithmetic and/or operational procedures of the adjusted set of model parameters on an input image from the first set of images.

The first machine learning model 114 can be or include at least one of a deep neural network model, an artificial neural network (ANN) model, a fully connected neural network, a convolutional neural network (CNN), a generative adversarial network (GAN), a K-Nearest Neighbors (KNN) model, a Support Vector Machine (SVM), and/or a decision tree. Specifically, in some instances, the first machine learning model 114 can be a neural network model configured to generate a first loss value that calculates a similarity score of the detected lane generated by the first machine learning model 114 to truth-value lanes in available in training data. The set of model parameters (e.g., weights, biases, activation functions, etc.) of the first machine learning model 114 can be adjusted to improve/optimize the similarity score based on at least one optimization algorithm (e.g., Adam optimization algorithm). The first machine learning model 114 can be/include a neural network configured to have an input layer, an output layer, and one or more hidden layers including a convolutional layer, a normalization layer, a hidden layer, a dropout layer, a pooling layer, an activation layer, and/or the like.

The localization model 115 is operatively coupled to the first machine learning model 114 and the data selector 116 and can optionally be coupled to the second machine learning model 117. The localization model can be/include an empirical model that generates a set of offset values for the first set of images based on the at least one lane (detected by the machine learning model 114) in each image from the first set of images and lane geometry data associated to that image.

The data selector 116 is operatively coupled to the first machine learning model 114 and the localization model 115 and can optionally be coupled to the second machine learning model 117. The data selector 116 can select a second set of images from the first set of images based on the set of offset values generated by the localization model 115. For example, in some instances, the data selector 116 can select the second set of images based on a previously-determined offset threshold. In some implementations, the data selector 116 can be configured to identify anomaly points within the set of offset values. For example, the data selector 116 can be a statistical model configured to detect anomaly points in the set of offset values.

The second machine learning model 117 can be optionally coupled to the first machine learning model 114, the localization model 115 and/or the data selector 116, and can be configured to classify an image from the first set of images to a scenario from a set of scenarios and in response to receiving an indication from the data selector 116 that the image is interesting to be used for further training the first machine learning model 114. The set of scenarios can include, for example, one or more road condition scenarios (e.g., under construction, no construction, etc.), one or more traffic condition scenarios (e.g., light traffic, heavy traffic, etc.), one or more day light scenarios (e.g., daytime, night, etc.), and/or one or more weather condition scenarios (e.g., rain, storm, snow, etc.), and/or the like. The second machine learning model 117 can be or include at least one of a deep neural network model, an artificial neural network (ANN) model, a fully connected neural network, a convolutional neural network (CNN), a generative adversarial network (GAN), a K-Nearest Neighbors (KNN) model, a Support Vector Machine (SVM), and/or a decision tree.

The vehicle 160 can be a car, a bus, a truck, a tractor trailer, a motorcycle, a bicycle, and/or the like, and/or a self-driving version of any of the above. The vehicle 160 can include a hardware-based computing device and/or a multimedia device. The vehicle 160 can be operatively coupled to the data collection device 110 to transmit, for example, data (e.g., images, videos, localization sensor data, etc.) to the data collection device 110, and receive, for example, the first machine learning model 114 from the data collection device 110 after being trained based on an initial training data. For example, in some implementations, the vehicle 160 can be an autonomous tractor trailer using the first machine learning model 114 to identify lanes and safely operate within lanes, and the vehicle 160 can continuously (or non-continuously) record a video stream and transmit the video stream to the data collection device 110. The data collection device 110 can identify interesting frames within the video stream and/or re-train the first machine learning model 114 based on those identified frames. The first machine learning model 114, after being re-trained, can be transmitted and deployed to the vehicle 160 and/or other vehicles within a fleet of vehicles that include vehicle 160.

The vehicle 160 includes a memory 162, a communication interface 163 and/or a processor 164 that are structurally and/or functionally similar to the memory 111, the communication interface 112 and/or the processor 113 as shown and described with respect to the data collection device 110. The vehicle 160 further includes a camera(s) 164 and a localization sensor(s) 165. The camera(s) 164 can be/include a forward-facing camera(s) a backward facing camera(s), a sideway camera(s), and/or a panoramic view camera(s), that capture the first set of images. The localization sensor(s) 165 can be/include a Global Position System (GPS) sensor(s), an odometry sensor(s), a Light Detection and Ranging (LIDAR) sensor(s), a Real-Time Kinematic (RTK) sensor(s), or an Inertial Measurement Unit (IMU) sensor(s), that capture the localization sensor data. In some implementations, the LIDAR sensor(s) can be used instead of, or in addition to, the camera(s) 164 to acquire point intensities and generate all or some of the first set of images. In yet some other implementations, a radar sensor(s) can be used instead of, or in addition to, the camera(s) 164 and/or the LIDAR sensor(s)

The server 170 can be/include a compute device particularly suitable for data storage purpose and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory 172, a communication interface 173 and/or a processor 174 that are structurally and/or functionally similar to the memory 111, the communication interface 112 and/or the processor 113 as shown and described with respect to the data collection device 110. In some implementations, however, the memory 172 can include application specific storage (e.g., deep learning storage servers) that is structurally and/or functionally different from the memory 111. Similarly, in some implementations, the processor 174 can include application specific processors (e.g., GPU rack servers) that are structurally and/or functionally different from the memory 111.

In some instances, the server 170 can be operatively coupled to a third-party entity(ies) (not shown) to collect data about the vehicle 160. In one example, the third-party entity(ies) can be a vehicle(s) (not shown) other than the vehicle 160 and close to the vehicle 160 and that has a similar view as the vehicle 160 and/or a view of the vehicle 160. The vehicle(s) other than the vehicle 160 can collect data (e.g., images, videos, sensor data) and send the data to the data collection device for identifying interesting data for training the first machine learning model 114. In another example, the third-party entity(ies) can be a satellite (not shown) that collects, for example, Global Position System (GPS) data for the vehicle 160. The satellite can send the GPS data (or any other type of Global Navigation Satellite System (GNSS) data) to the server 170, and the server 170 can send the GPS data to the data collection device 110 via the network 150.

The network 150 can be, for example, a digital telecommunication network of servers and/or compute devices. The servers and/or computes device on the network can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), any other suitable communication system, and/or a combination of such networks.

In use, the data collection device 110 can receive data including a first set of images and localization data from the vehicle 160 and/or the server 170. For example, in some instances, the vehicle 160 can continuously capture the first set of images (e.g., frames of a video stream) using at least one forward-facing camera 164 disposed at the vehicle 160 and send the first set of images to the data collection device 110. In some instances, the server 170 can be operatively coupled to a localization sensor 165 (e.g., a GPS sensor(s), an odometry sensor(s), a Light Detection and Ranging (LIDAR) sensor(s), a Real-Time Kinematic (RTK) sensor(s), or an Inertial Measurement Unit (IMU) sensor(s), etc.) disposed at the vehicle 160 and a global positioning system satellite; the localization sensor 165 can generate and send the localization data to the data collection device 110. In some instances, the first set of images can be preprocessed to be put in a condition (e.g., resized to 1280 pixels by 720 pixels image) for training and/or executing the first machine learning model 114.

In some implementations, the first machine learning model 114 (e.g., a convolutional neural network model) can be initially trained using a general training data (e.g., training data not selected by the data collection device 110 from past images and/or past videos and past lane indications). In an initial training phase, the first machine learning model 114 can be configured to receive the general training data in batches of data (e.g., based on a memory size of the memory 111, a memory type of the memory 111, a type of the processor 113, number of cores of the processor 113, and/or the like). In some implementations, the first machine learning model 114 can be a pre-trained machine learning model.

The first machine learning model 114 can be executed to detect at least one lane in each image from the first set of images, to produce a set of lane indications. In some implementations, the at least one lane can be indicated with a color-coded (e.g., red, blue, white, etc.) line(s) and or dot(s) (e.g., similar to detected lanes 302 shown and described with respect to FIG. 3 or detected lanes 402 shown and described with respect to FIG. 4, discussed further below). In some implementations, the at least one lane can be overlayed on corresponding image from the set of images with a color-coded line(s) and or dot(s).

The first set of images captured by the camera 165 can be also associated with localization data received from the localization sensor 165 of the vehicle 160. Therefore, each image from the first set of images can be associated with localization data for that image indicating a position (e.g., GPS data) and/or an orientation (e.g., IMU data) of the vehicle 160 in which that image was captured. Using the position and/or the orientation of the vehicle 160, the data collection device 110 can select lane geometry data from a map such as a high definition (HD) map.

The data collection device 110 can then execute the localization model 115 to generate a set of offset values (e.g., a pitch offset value(s), a yaw offset value(s), a lateral offset value(s), or a longitudinal offset value(s), and/or the like) for the first set of images based on the lane geometry data of the HD map, and the at least one lane in each image from the first set of images. In some implementations, the localization model 115 can be/include an image analysis model that executes an empirical model(s), a statistical model(s), and/or signal processing model(s) to generate the offset values. In some instances, the set of offset values can be a quantification of a difference in a shape of at least one lane detected by the first machine learning model 114 and a shape of the lane geometry data selected from the map. In some instances, each offset value from the set of offset values can be a physical measure of distance between a centerline of the at least one lane detected by the first machine learning model 114 and a centerline of the lane geometry data selected from the map.

The set of offset values generated by the localization model 115 can be processed by the data selector 116 to select a second set of images from the first set of images based on the set of offset values. In one example, the data selector 116 can select images with respective offset values larger or smaller than a previously-determined offset threshold. In another example, the data selector 116 can select images with respective offset values having a difference from offset values of neighboring images/frames larger than the previously-determined offset threshold. In yet another example, the data selector 116 can be a statistical model configured to identify anomaly points in the set of offset values. In yet another example, the data selector can 116 can select a previously-determined number of frames (e.g., 10 frames, 20 frames, 30 frames, etc.) around (before and/or after) each image with an offset value larger than the previously-determined offset threshold.

The first machine learning model 114, the localization model 115, and the data selector 116, each can be executed by the processor 113 of the data collection device 110 at machine speed. For example, in some instances, each of the first machine learning model 114, the localization model 115, and the data selector 116 can process an image from the first set of images, to identify/classify whether that image is interesting (e.g., under-represented data, rare data compared to generally collected data) or not in a short period of time such as, for example, 1 millisecond, 5 milliseconds, 10 milliseconds, 50 milliseconds, 100 milliseconds, and/or the like. Therefore, the data collection device 110 can identify interesting data (thousands of images, millions of images, and/or the like) for training the machine learning model (e.g., a lane detection convolutional neural network model) automatically and at machine speed. In one example, the processor 113 of the data collection device 110 can execute the first machine learning model 114, the localization model 115, and the data selector 116 on one million images and spend two milliseconds for each image to identify/classify whether that image is interesting or not. In sum, the processor 113 of the data collection device 110 would take less than an hour to identify interesting data among one million images.

In some implementations, the data collection device 110 can execute the second machine learning model 117 to classify each image from the second set of images to a scenario from a set of scenarios. In some instances, the set of scenarios can include one or more road condition scenarios. For example, the set of scenarios can include an under-construction road condition scenario at which a lane can be blocked at a random point. In some instances, the set of scenarios can include a traffic condition scenario(s). For example, the set of scenarios can include a slowdown before a red traffic light scenario(s) at which cars behind the traffic light adjust their speeds at different rates. In some instances, the set of scenarios can include an unexpected movement scenario. In one example, the set of scenarios can include a scenario(s) at which a car suddenly changes lane in front of the vehicle 160 without a lane change indicator. In another example, the set of scenarios can include a scenario(s) at which there is a traffic accident captured in the first set of images. In yet another example, the set of scenarios can include a scenario(s) at which a vehicle is parked, moving on to or moving out from a shoulder of a road. A classification of each image from the second set of images can be, for example, concatenated to or associated with that image from the second set of images, to produce a set of classified images. The data collection device 110 can then select a third set of images from the set of classified images based on at least one previously-determined (based on a statistical distribution of data available or data used to initially train first machine learning model) scenario of interest from the set of scenarios.

In some implementations, the data collection device 110 can execute a third machine learning model (not shown) to generate an indication of a location of the vehicle with respect to the at least one lane based on the at least one lane, each image from the first plurality of images, and the offset value. The third machine learning model can be optionally coupled to the first machine learning model 114, the localization model 115, the data selector 116 and/or the second machine learning model 11,7 and can be configured to generate an indication of location (e.g., a Cartesian coordinate) of the vehicle with respect to the at least one lane based on at least one of the at least one lane, respective image from the first set of images, and/or respective offset value. The third machine learning model can be or include at least one of a deep neural network model, an artificial neural network (ANN) model, a fully connected neural network, a convolutional neural network (CNN), a generative adversarial network (GAN), a K-Nearest Neighbors (KNN) model, a Support Vector Machine (SVM), and/or a decision tree.

In some instances, the processor 113 of the data collection device 110 can receive the second set of images and generate augmented images from the second set of images to generate diverse variations of the second set of images and increase the number of unique images for training the first machine learning model 114. In some instances, augmenting an image from the second set of images may involve normalizing brightness of the image, adding noise (e.g., a random noise) to the image, white-balancing the image, and/or the like. In some instances, augmenting the second set of images may involve rotating all or some of the second set of images, distorting all or some of the second set of images, color casting all or some of the second set of images, resizing all or some of the second set of images, filtering all or some of the second set of images, and/or the like. Augmenting the second set of images as described above can help generating additional images from the interesting data identified by the data collection device 110 and better generalizing the first machine learning model 114 for a robust lane detection in images.

In some implementations, the vehicle 160 can capture a sequence of inertial measurement unit (IMU) data using at least one IMU sensor and send the sequence of IMU data to the data collection device 110 via the network 150. The data collection device 110 can associate the sequence of IMU data to the first set of images, and thereafter, project the at least one lane detected for each image from the first set of images to a subset of IMU data, from the sequence of IMU data, associated with that image.

Although shown and described as separate devices, in some embodiments, the data collection device 110 can be part of or be added to the vehicle 160. For example, in some embodiments, the vehicle 160 can include and be configured to execute the first machine learning model 114, the localization model 115, the data selector model 116, and/or the second machine learning model 117. In some embodiments, one or more components and/or models of the data collection device can be part of or be executed at the server 170. For example, in some embodiments, the first machine learning model 114, the localization model 115, the data selector model 116, and/or the second machine learning model 117 can be run (or executed) by the server 170.

As mentioned above, although the data collection device 110, the vehicle 160, and the server 170 are shown and described as singular devices, it should be understood that, in some embodiments, one or more data collection devices, one or more vehicles, and/or one or more servers can be used. For example, in some embodiments, a first server can be used to store and organize data recorded by the camera 164 of the vehicle 160 and a second server can be used to retrieve localization data (e.g., GPS data) from a satellite.

Figure 2:
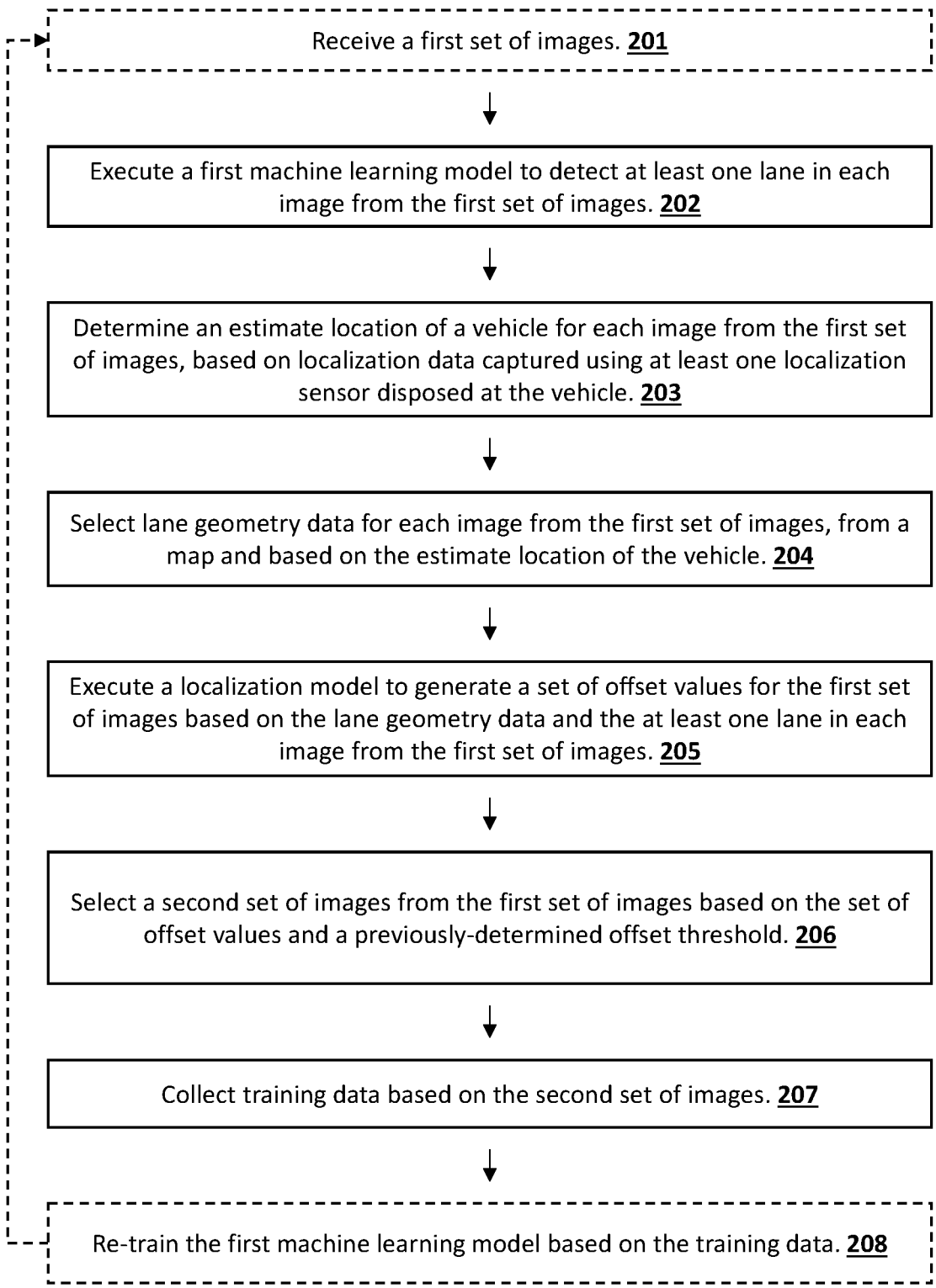
FIG. 2 is a schematic description of a method of using a data collection device, according to an embodiment.

FIG. 2 is a schematic description of a method 200 of using a data collection device, according to an embodiment. In some embodiments, the method 200 can be performed by a data collection device (e.g., such as the data collection device 110 as shown and described with respect to FIG. 1). At 201 a first set of images can be received from a vehicle (e.g., a self-driving car). The first set of images can be captured, for example, using a forward-facing camera disposed at the vehicle. In some implementations, the first set of images can be received from multiple vehicles. For example, the multiple vehicles, not including the vehicle itself, can be driving within a predetermined distance from the vehicle and each having a camera. The multiple vehicles can capture images and/or videos of the vehicle and/or the road in which the vehicle is driving, and send the captured images and/or videos directly to the data collection device or to a server (e.g., similar to sever 170 shown and described with respect to FIG. 1). In some implementations, a Light Detection and Ranging (LIDAR) sensor(s) and/or a radar sensor(s) can be used instead of, or in addition to, the camera 165 to acquire point intensities and generate all or some of the first set of images.

At 202, a first machine learning model is executed to detect at least one lane in each image from the first set of images. The first machine learning model can be/include, for example, a neural network model previously trained on past images, each captured by cameras exposed on vehicles and labeled with lanes. At 203 an estimate location of a vehicle is determined for each image from the first set of images, based on localization data captured using at least one localization sensor disposed at the vehicle. The at least one localization sensor can include, but is not limited to, a Global Position System (GPS) sensor, an odometry sensor, a Light Detection and Ranging (LIDAR) sensor, a Real-Time Kinematic (RTK) sensor, or an Inertial Measurement Unit (IMU) sensor, etc.

At 204, lane geometry data is selected for each image from the first set of images, for example, from a high definition (HD) map and based on the estimate location of the vehicle. In some instances, each image from the first set of images can be associated with localization data for that image, indicating a position (e.g., GPS data) and/or an orientation (e.g., IMU data) of the vehicle in which that image was captured. Using the position and/or the orientation of the vehicle, the data collection device can then select lane geometry data from the HD map. At 205, a localization model is executed to generate a set of offset values (e.g., a pitch offset value(s), a yaw offset value(s), a lateral offset value(s), or a longitudinal offset value(s), and/or the like) for the first set of images based on the lane geometry data and the at least one lane in each image from the first set of images. In some instances, each offset value from the set of offset values can be a physical measure of distance (e.g., in meters, inches, etc.). In some instances, each offset value from the set of offset values can indicate a difference in a shape of at least one lane detected by the first machine learning model and a shape of the lane geometry data selected from the HD map. The difference between the shapes can be calculated/quantified using, for example, a geospatial vector difference comparison.

At 206, a second set of images is selected from the first set of images based on the set of offset values and a previously-determined offset threshold. For example, in some instances, the data collection device can use a data selector (similar to the data selector 116 shown and described with respect to FIG. 1) to select the second set of images based on a previously-determined offset threshold. In some instances, the data collection device can be configured to identify anomaly points within the set of offset values. For example, the selection of the second set of images from the first set of images can be done automatically and at machine speed (e.g., performed by the data collection device 110 shown and described with respect to FIG. 1). For example, in some instances, the method 200 can identify/classify whether an image from the first set of images is interesting (e.g., under-represented data, rare data compared to generally collected data) or not in a short period of time such as, for example, 1 millisecond, 5 milliseconds, 10 milliseconds, 50 milliseconds, 100 milliseconds, and/or the like, that is not achievable by a user of the data collection device.

At 207, training data is collected based on the second set of images. In some implementations, the method 200 from step 201 to step 206 can be repeated until a pre-determined number of data is collected. The second set of images can be labeled (e.g., manually by the user of the data collection device 110) with and associated with lane indicators. In some implementations, the second set of images can be augmented (e.g., by rotating the second set of images, white-balancing the second set of images, adding random noise to the second set of images, etc.) to generate diverse variations of the second set of images and increase the number of unique images for training the first machine learning model. At 208, the first machine learning model can optionally be re-trained based on the training data for an improved accuracy of lane detection of the first machine learning model and/or an improved safety of the vehicle. After re-training the first machine learning model and confirming a higher accuracy for the retrained machine learning model, the retrained machine learning model can be deployed to the vehicle(s) for use on the vehicle(s) and to collect more training data.

In some implementations, the method 200 can further include executing a second machine learning model to classify each image from the second set of images to a scenario from a set of scenarios. In some implementations, a class/category (e.g., day, night, heavy traffic, rainy, sunny, etc.) of each image from the second set of images can be added to (e.g., concatenated to or be associated with) to that image from the second set of images, to produce a set of classified images. The data collection device can then select a third set of images from the set of classified images based on at least one previously-determined scenario of interest (based on a statistical distribution of data available or data used to initially train first machine learning model) from the set of scenarios.

In some implementations, the first set of images can be ordered in a time sequence (e.g., time sequence of video frames in a video). The data collection device can select/identify a first image from the first set of images as interesting and based on a previously-determined offset threshold (e.g., having an offset larger than 10 centimeters, 50 centimeters, 1 meter, etc.). The first image can be associated with a first time (e.g., a time label with time of day the first image was captured by the camera) in the time sequence. The data collection device can also select a second image from the first set of images as interesting and based on a previously-determined offset threshold. The second image can be associated with a second time after the first time in the time sequence. The data collection device can then select the second set of images such that every image in the time sequence from the first image to the second image is included in the second set of images. In some instances, the data selector of the data collection device can include a rule-based model configured to select an image(s) with respective offset values larger than the previously-determined offset threshold and then extract a previously-determined number frames/images (e.g., ten frames/images, twenty frames/images, and/or the like) surrounding that image(s).

Figure 3:
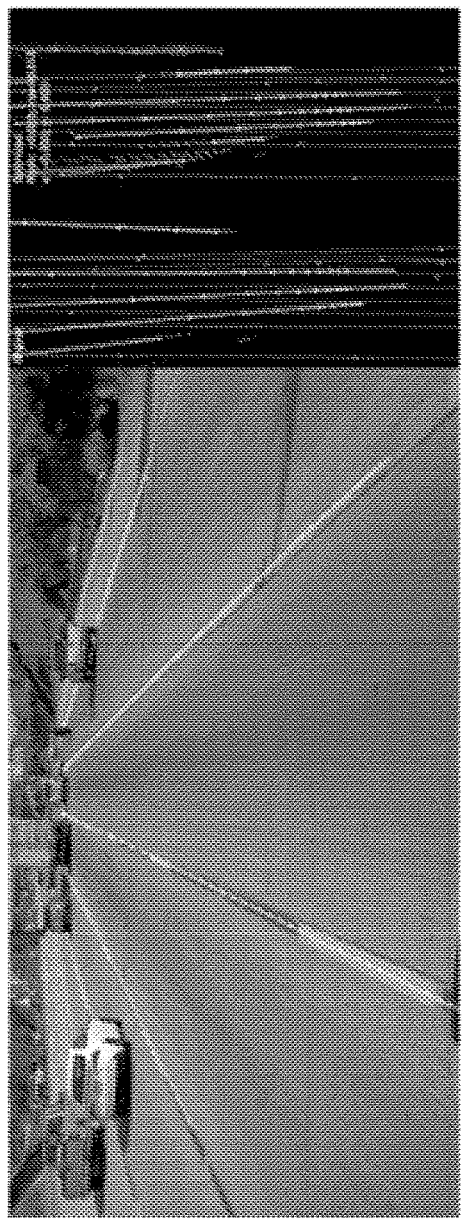
FIG. 3 shows examples of offset values generated based on images collected from a vehicle, that indicate not-interesting data, according to an embodiment.
Figure 3:
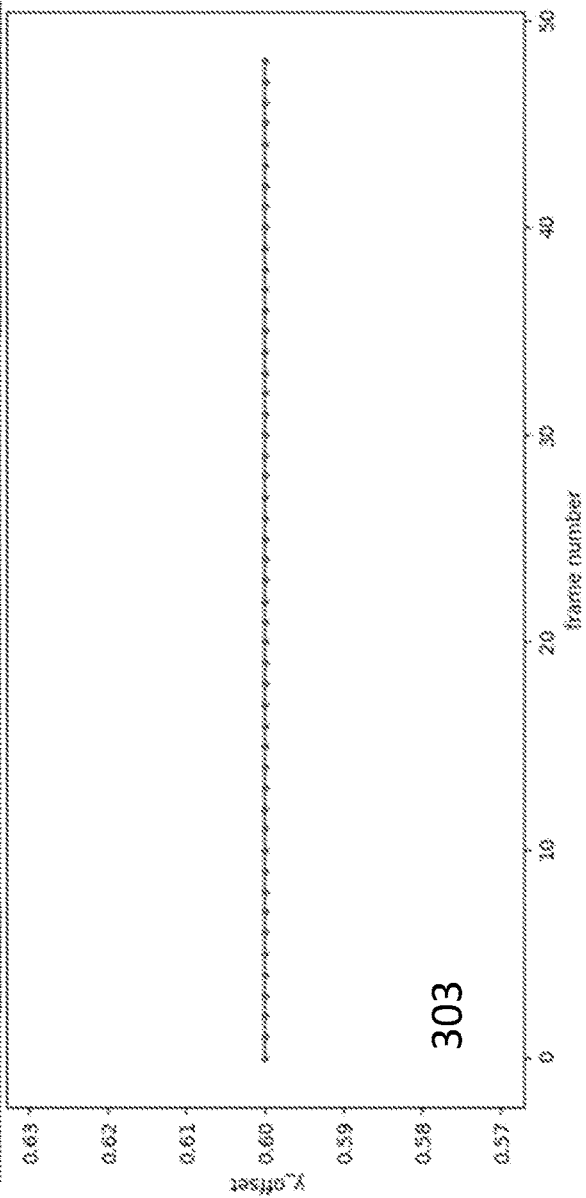

FIG. 3 shows examples of offset values 303 generated based on images collected from a vehicle, that indicate uninteresting data, according to an embodiment. As shown, a machine learning model (e.g., such as the first machine learning model 114 as shown and described with respect to FIG. 1) can be used to detect lanes in an image 301 from a set of images captured by a vehicle. The detected lanes 302 can be compared to image of lanes selected from a map to generate the offset values 303. In some instances, the offset values can indicate, for example, a difference between shapes of the detected lanes and the lanes selected from the map. In some instances, the offset values can indicate, for example, a physical measure of distance (e.g., in meters unit). In some implementations, the set of images can be continuous frames of a video stream recorded by a camera disposed at the vehicle. As shown, the offset values can be constant and show a flat curve (without anomaly points). Therefore, no frames/images are selected from the set of images for further training the machine learning model.

Figure 4:
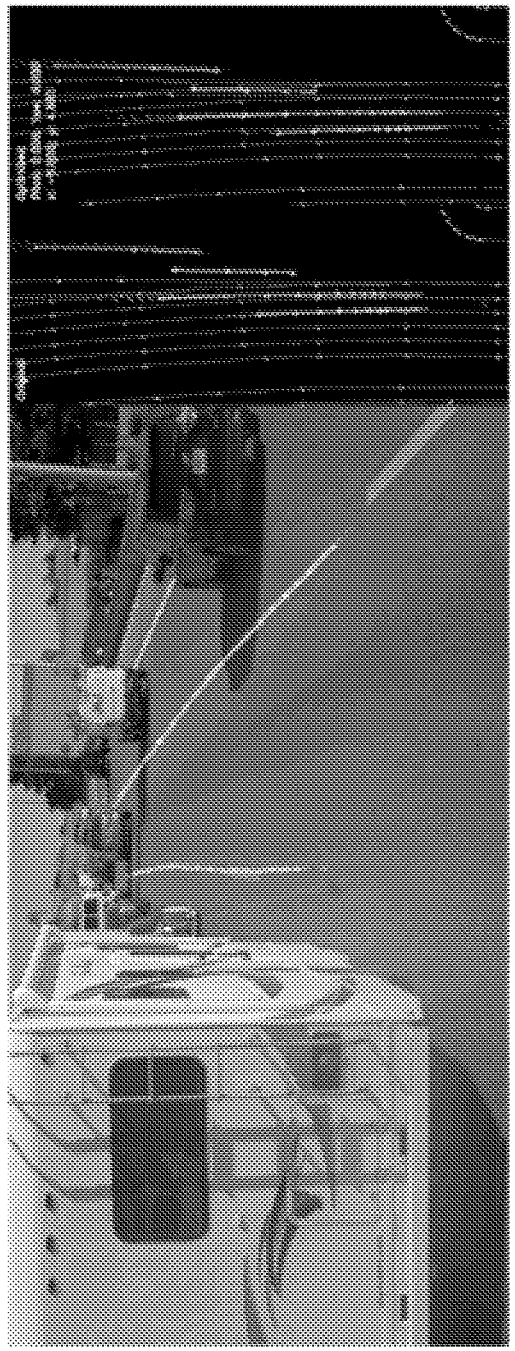
FIG. 4 shows examples of offset values generated based on images collected from a vehicle, that indicate interesting data, according to an embodiment.
Figure 4:
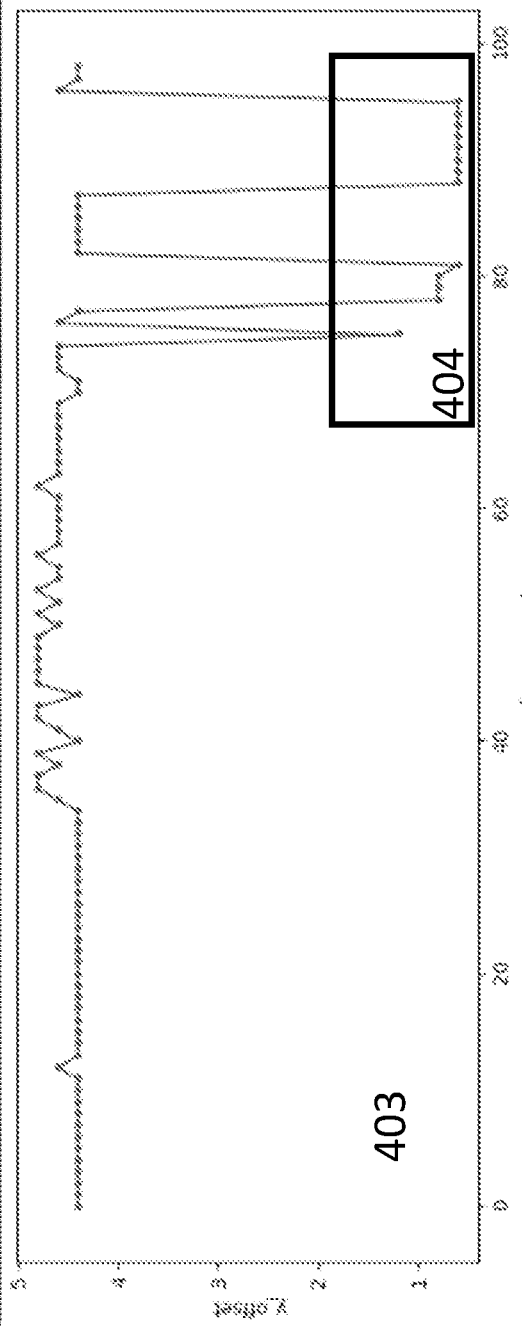

FIG. 4 shows examples of offset values generated based on images collected from a vehicle, that indicate interesting data, according to an embodiment. As shown, a machine learning model (e.g., such as the first machine learning model 114 as shown and described with respect to FIG. 1) can be used to detect lanes in an image 401 from a set of images captured by a vehicle. The detected lanes 402 can be compared to image of lanes selected from a map to generate a set of offset values 403. As shown, in some implementations, the offset values can be defined such that a larger offset value can indicate better similarity between the detected lanes 402 and the lanes selected from a map. In some instances, a data selector (such as the data selector 116 shown and described with respect to FIG. 1) can identify anomaly points 404 within the offset values. In one example, the data selector can be a first rule-based model configured to select images with respective offset values larger or smaller than a previously-determined offset threshold. In another example, the data selector can be a second rule-based model configured to select images with respective offset values having a difference from offset values of surrounding frames larger than the previously-determined offset threshold (e.g., 2). In yet another example, the data selector can be a statistical model configured to detect anomaly points in the set of offset values. Following the example of FIG. 4, the identified anomaly points 404 can be used to identity the associated interesting frames, which then can be sent to a data collection device for further analysis as described above.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method comprising:
    detecting, by a computing system, an object in an image based on a machine learning model;
    selecting, by the computing system, object geometry data from a map based on localization data associated with the image;
    generating, by the computing system, an offset value associated with the image based on a difference between the object in the image and the object geometry data from the map, the offset value satisfying a selected offset threshold;
    determining, by the computing system, a time sequence of images between the image and a second image associated with a second offset value that satisfies a second selected offset threshold; and
    training, by the computing system, the machine learning model based at least in part on the images.

2. The computer-implemented method of claim 1, wherein the localization data indicates at least one of a position or an orientation of a vehicle.

3. The computer-implemented method of claim 1, further comprising:
    determining that a selected scenario of a plurality of scenarios is underrepresented; and
    associating the image with the selected scenario, wherein the machine learning model is trained to detect objects in the selected scenario.

4. The computer-implemented method of claim 1, wherein the image is captured by a camera disposed with a vehicle.

5. The computer-implemented method of claim 1, wherein the machine learning model is further trained based on images that are a selected number of frames before or after the image in a sequence including the image.

6. The computer-implemented method of claim 1, wherein the offset value includes at least one of a pitch offset value, a yaw offset value, a lateral offset value, or a longitudinal offset value.

7. The computer-implemented method of claim 1, wherein the offset value is associated with a difference in a shape of the object and a shape of the object geometry data.

8. The computer-implemented method of claim 1, further comprising:
augmenting the image to generate an augmented image with which the machine learning model is further trained, wherein the augmenting comprises at least one of rotating the image, distorting the image, color casting the image, resizing the image, or filtering the image.

9. The computer-implemented method of claim 1, wherein the localization data is determined based at least in part on a localization sensor disposed with a vehicle including at least one of a Global Position System (GPS) sensor, an odometry sensor, a Light Detection and Ranging (LIDAR) sensor, a Real-Time Kinematic (RTK) sensor, or an Inertial Measurement Unit (IMU) sensor.

10. The computer-implemented method of claim 1, wherein the object is a lane.

11. A system comprising:
at least one processor; and
a memory storing instructions that, when executed by the at least one processor, cause the system to perform operations comprising:
detecting an object in an image based on a machine learning model;
selecting object geometry data from a map based on localization data associated with the image;
generating an offset value associated with the image based on a difference between the object in the image and the object geometry data from the map, the offset value satisfying a selected offset threshold;
determining a time sequence of images between the image and a second image associated with a second offset value that satisfies a second selected offset threshold; and
training the machine learning model based at least in part on the images.

12. The system of claim 11, wherein the localization data indicates at least one of a position or an orientation of a vehicle.

13. The system of claim 11, wherein the operations further comprise:
determining that a selected scenario of a plurality of scenarios is underrepresented; and
associating the image with the selected scenario, wherein the machine learning model is trained to detect objects in the selected scenario.

14. The system of claim 11, wherein the image is captured by a camera disposed with a vehicle.

15. The system of claim 11, wherein the object is a lane.

16. A non-transitory computer-readable storage medium including instructions that, when executed by at least one processor of a computing system, cause the computing system to perform operations comprising:
detecting an object in an image based on a machine learning model;
selecting object geometry data from a map based on localization data associated with the image;
generating an offset value associated with the image based on the object and the object geometry data, wherein the offset value is associated with a difference between the object in the image and the object geometry data from the map, the offset value satisfying a selected offset threshold;
determining a time sequence of images between the image and a second image associated with a second offset value that satisfies a second selected offset threshold; and
training the machine learning model based at least in part on the images.

17. The non-transitory computer-readable storage medium of claim 16, wherein the localization data indicates at least one of a position or an orientation of a vehicle.

18. The non-transitory computer-readable storage medium of claim 16, further comprising:
determining that a selected scenario of a plurality of scenarios is underrepresented; and
associating the image with the selected scenario, wherein the machine learning model is trained to detect objects in the selected scenario.

19. The non-transitory computer-readable storage medium of claim 16, wherein the image is captured by a camera disposed with a vehicle.

20. The non-transitory computer-readable storage medium of claim 16, wherein the object is a lane.

* * * * *